US012739902B2

(12) United States Patent
Otaka et al.

(10) Patent No.: US 12,739,902 B2
(45) Date of Patent: Sep. 15, 2026

(54) COMMUNICATION DEVICE, RELAY DEVICE, CONTROL METHOD, AND COMPUTER-READABLE STORAGE MEDIUM

(71) Applicant: HONDA MOTOR CO., LTD., Tokyo (JP)

(72) Inventors: Masaru Otaka, Tokyo (JP); Ryusuke Tamanaha, Tokyo (JP); Naoko Imai, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 328 days.

(21) Appl. No.: 18/233,534

(22) Filed: Aug. 14, 2023

(65) Prior Publication Data

US 2023/0389096 A1 Nov. 30, 2023

Related U.S. Application Data

(63) Continuation of application No. PCT/JP2021/006982, filed on Feb. 25, 2021.

(51) Int. Cl.
*H04W 76/14* (2018.01)
*H04W 72/25* (2023.01)
(Continued)

(52) U.S. Cl.
CPC ........... *H04W 76/14* (2018.02); *H04W 72/25* (2023.01); *H04W 72/542* (2023.01); *H04W 76/15* (2018.02)

(58) Field of Classification Search
CPC ......... H04B 1/406; H04B 7/15; H04L 1/0026; H04L 27/0008; H04L 27/0012;
(Continued)

(56) References Cited

U.S. PATENT DOCUMENTS 6,526,034 B1 2/2003 Gorsuch
7,013,162 B2 3/2006 Gorsuch
(Continued)

FOREIGN PATENT DOCUMENTS

CN 105229971 A 1/2016
EP 2983408 A1 2/2016
(Continued)

OTHER PUBLICATIONS

Extended European Search Report for European Patent Application No. 21927814.0 mailed Feb. 14, 2024.
(Continued)

*Primary Examiner* — Thomas R Cairns
(74) *Attorney, Agent, or Firm* — THOMAS | HORSTEMEYER, LLP

(57) ABSTRACT

A communication device that performs communication wirelessly transmits, to one or more other communication devices, a request signal requesting information indicating a condition regarding communication with a predetermined device, in each of one or more communication methods in the one or more other communication devices, receives, from at least any of the one or more other communication devices, a response including the information indicating the condition regarding the communication in the other communication devices, selects, based on the received response, a device to be requested to transfer the communication of the communication device from a transmission source device of the response, and selects a communication method in the device to be used for transferring, and performs connection establishment processing including requesting the selected device to relay the communication of the communication device.

20 Claims, 3 Drawing Sheets

(51) Int. Cl.
*H04W 72/542* (2023.01)
*H04W 76/15* (2018.01)

(58) Field of Classification Search
CPC .. H04L 69/14; H04W 4/40–48; H04W 8/005; H04W 40/22; H04W 48/14; H04W 48/20; H04W 72/20; H04W 72/25; H04W 72/542; H04W 74/02; H04W 76/14; H04W 76/15; H04W 84/042; H04W 84/12; H04W 84/18; H04W 88/04; H04W 88/06; H04W 92/18; H04W 16/26; H04W 52/02; H04W 76/16; H04W 76/23; H04W 76/28; H04W 84/047
See application file for complete search history.

(56) References Cited

U.S. PATENT DOCUMENTS 7,616,970 B2 11/2009 Gorsuch
8,380,244 B2 2/2013 Gorsuch
8,548,478 B2 10/2013 Ozluturk
8,754,788 B2 6/2014 Yamamoto
8,792,439 B2 7/2014 Kahn et al.
9,408,253 B2 8/2016 Gorsuch
9,420,632 B2 8/2016 Gorsuch
9,451,654 B2 9/2016 Jafarian et al.
9,572,087 B2 2/2017 Nagasaka et al.
9,674,778 B2 6/2017 Nagasaka et al.
9,814,087 B2 11/2017 Yanagi et al.
10,045,271 B2 8/2018 Ozluturk
10,097,964 B2 10/2018 Zhang et al.
10,129,412 B1 11/2018 Singh et al.
10,171,967 B2 1/2019 Ameixieira
10,171,986 B2 1/2019 Tsuchie
10,172,079 B2 1/2019 Nagasaka et al.
10,194,360 B2 1/2019 Sirotkin et al.
10,194,361 B2 1/2019 Sirotkin et al.
10,356,640 B2 7/2019 Sirotkin et al.
10,375,618 B2 8/2019 Onishi et al.
10,440,452 B2 10/2019 Mach et al.
10,530,461 B2 * 1/2020 Sadiq .................... H04W 76/10
10,542,478 B2 1/2020 Tsuchie
10,565,874 B1 2/2020 Lei et al.
10,575,149 B2 2/2020 Wu et al.
10,588,112 B2 3/2020 Lee et al.
10,605,927 B2 3/2020 Marmet et al.
10,623,919 B2 4/2020 Yamada et al.
10,708,812 B2 7/2020 Basu Mallick et al.
10,743,159 B2 8/2020 Ameixieira
10,826,769 B2 11/2020 Deng et al.
10,841,762 B2 11/2020 Henry et al.
10,924,912 B2 2/2021 Kim et al.
10,966,226 B2 3/2021 Feng et al.
10,967,880 B2 4/2021 Rodriguez Bravo et al.
11,064,323 B2 7/2021 Esselink et al.
11,172,327 B2 11/2021 Nguyen et al.
11,197,180 B2 12/2021 Uchiyama et al.
11,310,717 B2 4/2022 Lin et al.
11,350,445 B2 5/2022 Fujishiro et al.
11,438,736 B2 9/2022 Fehrenbach et al.
11,452,032 B2 9/2022 Gupta et al.
11,472,405 B2 10/2022 Vassilovski et al.
11,595,977 B2 2/2023 Feng et al.
11,653,292 B2 5/2023 Azizi et al.
11,665,730 B2 5/2023 Ahmad
11,716,754 B2 8/2023 Fujishiro et al.
11,760,369 B2 9/2023 Rodriguez Bravo et al.
11,778,416 B2 10/2023 Nguyen et al.
11,800,439 B2 10/2023 Azizi et al.
12,047,931 B2 7/2024 Wang
12,074,829 B2 8/2024 Ibrahim et al.
12,127,145 B2 10/2024 Li et al.
12,267,715 B2 4/2025 Wang et al.
2003/0093491 A1 5/2003 Valjakka et al.
2004/0018854 A1 1/2004 Gorsuch
2005/0107085 A1 5/2005 Ozluturk
2006/0075119 A1 4/2006 Hussain et al.
2006/0116129 A1 6/2006 Gorsuch
2006/0245398 A1 11/2006 Li et al.
2008/0165795 A1 7/2008 Baruch
2010/0150157 A1 6/2010 Wang et al.
2010/0202425 A1 8/2010 Gorsuch
2011/0012756 A1 1/2011 Yamamoto
2011/0310748 A1 12/2011 Mizugaki et al.
2012/0020250 A1 1/2012 Sundararaman et al.
2012/0207080 A1 8/2012 Chang et al.
2013/0086164 A1 4/2013 Wheeler et al.
2013/0089033 A1 4/2013 Kahn et al.
2013/0143551 A1 6/2013 Gorsuch
2013/0301615 A1 11/2013 Ozluturk
2014/0056210 A1 2/2014 Jafarian et al.
2014/0079022 A1 3/2014 Wang et al.
2014/0086219 A1 3/2014 Suzuki et al.
2014/0161103 A1 6/2014 Sirotkin et al.
2015/0133187 A1 5/2015 Gorsuch
2016/0007152 A1 1/2016 Johnsson et al.
2016/0029295 A1 1/2016 Nagasaka et al.
2016/0057105 A1 2/2016 Kato
2016/0157182 A1 6/2016 Izawa et al.
2016/0212787 A1 7/2016 Yanagi et al.
2016/0227380 A1 8/2016 Zhang et al.
2016/0227463 A1 8/2016 Baligh et al.
2016/0285539 A1 9/2016 Sadiq et al.
2016/0337960 A1 11/2016 Nagasaka et al.
2016/0353508 A1 12/2016 Gorsuch
2017/0245132 A1 8/2017 Tsuchie
2017/0245254 A1 8/2017 Kitagawa et al.
2017/0245295 A1 8/2017 Jung et al.
2017/0273016 A1 9/2017 Nagasaka et al.
2017/0289896 A1 10/2017 Onishi et al.
2017/0325243 A1 11/2017 Yasukawa et al.
2017/0332291 A1 11/2017 Sirotkin et al.
2017/0353777 A1 12/2017 Mach et al.
2018/0020383 A1 1/2018 Sirotkin et al.
2018/0027429 A1 1/2018 Li et al.
2018/0176927 A1 6/2018 Deng et al.
2018/0279096 A1 9/2018 Wu et al.
2018/0284291 A1 10/2018 Marmet et al.
2018/0310293 A1 10/2018 Lee et al.
2018/0317067 A1 11/2018 Ameixieira
2018/0368048 A1 * 12/2018 Tsuchie ................ H04W 40/12
2019/0081884 A1 3/2019 Spohn et al.
2019/0116609 A1 4/2019 Feng et al.
2019/0215670 A1 7/2019 Ameixieira
2019/0349951 A1 11/2019 Ahmad
2019/0364492 A1 11/2019 Azizi et al.
2019/0373493 A1 12/2019 Uchiyama et al.
2019/0380121 A1 12/2019 Wu et al.
2019/0387429 A1 12/2019 Basu Mallick et al.
2020/0021941 A1 1/2020 Nguyen et al.
2020/0023862 A1 1/2020 Rodriguez Bravo et al.
2020/0029184 A1 1/2020 Yamada et al.
2020/0068365 A1 2/2020 Esselink et al.
2020/0092685 A1 3/2020 Fehrenbach et al.
2020/0100088 A1 3/2020 Kim et al.
2020/0107399 A1 4/2020 Pu et al.
2020/0187245 A1 6/2020 Fujishiro et al.
2020/0205062 A1 6/2020 Azizi et al.
2020/0207343 A1 7/2020 Vassilovski et al.
2020/0229124 A1 7/2020 Soriaga et al.
2020/0288374 A1 9/2020 Henry et al.
2020/0314608 A1 10/2020 Harada et al.
2020/0344708 A1 10/2020 Liao
2020/0404571 A1 12/2020 Lin et al.
2021/0020044 A1 1/2021 Adkar et al.
2021/0058905 A1 2/2021 Ganesan et al.
2021/0171055 A1 6/2021 Rodriguez Bravo et al.
2021/0176774 A1 6/2021 Feng et al.
2021/0195498 A1 6/2021 Otsuya et al.
2021/0312806 A1 10/2021 Kulakov
2021/0314730 A1 10/2021 Nguyen et al.
2021/0337365 A1 10/2021 Esselink et al.
2022/0095250 A1 3/2022 Lee et al.
2022/0103243 A1 3/2022 Damnjanovic

(56) References Cited

U.S. PATENT DOCUMENTS

| | | | | |
|---|---|---|---|---|
| 2022/0200742 | A1 | 6/2022 | Li et al. | |
| 2022/0217771 | A1 | 7/2022 | Liu et al. | |
| 2022/0256587 | A1 | 8/2022 | Fujishiro et al. | |
| 2022/0279609 | A1 | 9/2022 | Wu et al. | |
| 2022/0322359 | A1 | 10/2022 | Ye et al. | |
| 2022/0337990 | A1* | 10/2022 | Ebrahim Rezagah | H04W 76/14 |
| 2022/0365163 | A1 | 11/2022 | Baek et al. | |
| 2022/0369215 | A1 | 11/2022 | Dees et al. | |
| 2022/0408226 | A1 | 12/2022 | Fehrenbach et al. | |
| 2023/0050943 | A1 | 2/2023 | Luo et al. | |
| 2023/0053351 | A1 | 2/2023 | Cheng et al. | |
| 2023/0056831 | A1 | 2/2023 | Manolakos et al. | |
| 2023/0138578 | A1 | 5/2023 | Azizi et al. | |
| 2023/0156691 | A1 | 5/2023 | Feng et al. | |
| 2023/0180178 | A1 | 6/2023 | Yang | |
| 2023/0232370 | A1 | 7/2023 | Yang | |
| 2023/0239714 | A1 | 7/2023 | Fujishiro et al. | |
| 2023/0247518 | A1 | 8/2023 | Zhang | |
| 2023/0247695 | A1 | 8/2023 | Fujishiro et al. | |
| 2023/0262749 | A1 | 8/2023 | Ahmad | |
| 2023/0262835 | A1 | 8/2023 | Li et al. | |
| 2023/0262842 | A1 | 8/2023 | Uchiyama et al. | |
| 2023/0269730 | A1 | 8/2023 | Sun et al. | |
| 2023/0284046 | A1 | 9/2023 | Ly et al. | |
| 2023/0292233 | A1 | 9/2023 | Cheng et al. | |
| 2023/0292234 | A1 | 9/2023 | Chang et al. | |
| 2023/0309009 | A1 | 9/2023 | Back et al. | |
| 2024/0015637 | A1 | 1/2024 | Cheng et al. | |
| 2024/0031888 | A1 | 1/2024 | Cheng et al. | |
| 2024/0031891 | A1 | 1/2024 | Cheng et al. | |
| 2024/0048524 | A1 | 2/2024 | Mihály et al. | |
| 2024/0056166 | A1 | 2/2024 | Chang et al. | |
| 2024/0064606 | A1 | 2/2024 | Yang | |
| 2024/0064838 | A1 | 2/2024 | Orsino et al. | |
| 2024/0073889 | A1 | 2/2024 | Yuan et al. | |
| 2024/0080722 | A1 | 3/2024 | Teyeb et al. | |
| 2024/0121677 | A1 | 4/2024 | Wu et al. | |
| 2024/0259906 | A1 | 8/2024 | Freda et al. | |

FOREIGN PATENT DOCUMENTS

| | | | |
|---|---|---|---|
| EP | 3554137 | A1 | 10/2019 |
| JP | 2007096917 | A | 4/2007 |
| JP | 2007534222 | A | 11/2007 |
| JP | 2009212753 | A | 9/2009 |
| JP | 2011049929 | A | 3/2011 |
| JP | 2012004891 | A | 1/2012 |
| JP | 2012216887 | A | 11/2012 |
| JP | 2013038652 | A | 2/2013 |
| JP | 2013141126 | A | 7/2013 |
| JP | 2013197887 | A | 9/2013 |
| JP | 2014534681 | A | 12/2014 |
| JP | 2015534355 | A | 11/2015 |
| JP | 2016134755 | A | 7/2016 |
| JP | 2017076981 | A | 4/2017 |
| JP | 2017184051 | A | 10/2017 |
| JP | 2018528684 | A | 9/2018 |
| JP | 2019516282 | A | 6/2019 |
| WO | 2005050965 | A1 | 6/2005 |
| WO | 2013054722 | A1 | 4/2013 |
| WO | 2014043500 | A1 | 3/2014 |
| WO | 2017166260 | A1 | 10/2017 |
| WO | 2018056386 | A1 | 3/2018 |
| WO | 2018/125686 | A2 | 7/2018 |
| WO | 2018/200438 | A1 | 11/2018 |
| WO | 2018/202797 | A1 | 11/2018 |
| WO | 2018/202798 | A1 | 11/2018 |
| WO | 2019031427 | A1 | 2/2019 |
| WO | 2021001086 | A1 | 1/2021 |
| WO | 2021/022443 | A1 | 2/2021 |
| WO | 2022180710 | A1 | 9/2022 |
| WO | 2022180711 | A1 | 9/2022 |
| WO | 2022180712 | A1 | 9/2022 |
| WO | 2022180713 | A1 | 9/2022 |
| WO | 2022180714 | A1 | 9/2022 |

OTHER PUBLICATIONS

U.S. Office Action for U.S. Appl. No. 18/233,544 mailed Dec. 13, 2023.

Office Action for U.S. Appl. No. 18/234,125 mailed Aug. 19, 2025.

Specification & Drawings for U.S. Appl. No. 63/083,845, filed Sep. 25, 2020.

Office Action for U.S. Appl. No. 18/234,118 mailed Sep. 8, 2025.

Office Action for U.S. Appl. No. 18/233,523 mailed Oct. 23, 2025.

U.S. Office Action for U.S. Appl. No. 18/233,544 mailed Oct. 18, 2024.

U.S. Office Action for U.S. Appl. No. 18/233,544 mailed Jun. 12, 2024.

Extended European Search Report for European Patent Application No. 21927815.7 mailed Jan. 3, 2024.

European Search Report for European Patent Application No. 21927816.5 mailed Dec. 18, 2023.

Miyakita et al., Basic Study on Mobile Network Problems., IEICE Technical Report. Oct. 20, 2016, vol. 116, No. 272, pp. 85-90, section 1, Japan. (with partial English Translation).

Yamamura et al., Cost Efficient Data Transfer with Heterogeneous Wireless Networks., IEICE Technical Report. Feb. 28, 2013, vol. 112, No. 463, sections 2, 3, Japan. (with partial English Translation).

International Search Report for PCT/JP2021/006978 mailed Apr. 27, 2021 with partial English Translation.

International Search Report for PCT/JP2021/006982 mailed May 25, 2021 with partial English Translation.

International Search Report for PCT/JP2021/006981 mailed May 25, 2021 with partial English Translation.

International Search Report for PCT/JP2021/006979 mailed Apr. 27, 2021 with partial English Translation.

International Search Report for PCT/JP2021/006980 mailed May 18, 2021 with partial English Translation.

U.S. Appl. No. 18/233,523, filed Aug. 14, 2023.

U.S. Appl. No. 18/233,544, filed Aug. 14, 2023.

U.S. Appl. No. 18/234,118, filed Aug. 15, 2023.

U.S. Appl. No. 18/234,125, filed Aug. 15, 2023.

Extended European Search Report for European Patent Application No. 21927813.2 mailed Jan. 26, 2024.

Extended European Search Report for European Patent Application No. 21927816.5 mailed Feb. 29, 2024.

Extended European Search Report for European Patent Application No. 21927812.4 mailed Feb. 28, 2024.

Office Action for U.S. Appl. No. 18/233,544 mailed May 6, 2025.

Office Action for U.S. Appl. No. 18/234,118 mailed Mar. 17, 2026.

CN Office Action for CN Patent Application No. 202180091968.8 mailed Jul. 1, 2026.

R2-152548, On connection establishment over PC5, 3GPP TSG RAN WG2 #90, May 25-29, 2015, Fukuoka, Japan.

CN Office Action for CN Patent Application No. 202180092283.5 mailed Jul. 7, 2026 (with machine translation).

* cited by examiner

COMMUNICATION DEVICE, RELAY DEVICE, CONTROL METHOD, AND COMPUTER-READABLE STORAGE MEDIUM

CROSS-REFERENCE TO RELATED APPLICATION(S)

This application is a continuation of International Patent Application No. PCT/JP2021/006982 filed on Feb. 25, 2021, the entire disclosures of which is incorporated herein by reference.

BACKGROUND OF THE INVENTION

Field of the Invention

The present invention relates to a communication device, a relay device, a control method, and a program, and more particularly, to a technique for selecting a relay device in relay transmission.

Description of the Related Art

Vehicle-to-Everything (V2X) communication, by which a vehicle communicates wirelessly with another vehicle or an object, enables the vehicle to acquire various types of information or to provide information to others. When a vehicle transmits data to a device such as a server on the Internet or a network that has been constructed by a service provider, the vehicle has to connect to a predetermined communication device such as, for example, a base station or an access point through which the vehicle is capable of connecting to the network. However, vehicles are not always in an environment where the connection to such a predetermined communication device is enabled. For this reason, it is supposed that a vehicle communicates with a predetermined communication device through, for example, another vehicle capable of connecting to such a predetermined communication device. Japanese Patent Laid-Open No. 2017-184051 describes a configuration for connecting between vehicles to transfer data to a predetermined node. In Japanese Patent Laid-Open No. 2017-184051, a vehicle close to the predetermined node is identified by communication between the vehicles, and data is transferred to the vehicle close to the predetermined node.

When a communication device establishes a connection with another device in order to communicate with a predetermined device, it is supposed that the communication device is incapable of recognizing what type of communication such another device is capable of performing with the predetermined device. In this case, after the communication device is connected with another device, the connection between such another device and the predetermined device can be established only in a communication method at an insufficient communication rate. Hence, the communication device may be incapable of communicating with the predetermined device at a sufficient communication rate.

SUMMARY OF THE INVENTION

The present invention provides a technique that enables a communication device to appropriately select another device that relays communication with a predetermined device.

A communication device according to one aspect of the present invention is a communication device that performs communication wirelessly, the communication device comprising: a requesting unit configured to transmit, to one or more other communication devices, a request signal requesting information indicating a condition regarding communication between a predetermined device and the other communication devices, in each of one or more communication methods in the one or more other communication devices, the predetermined device being different from the communication device; a receiving unit configured to receive, from at least any of the one or more other communication devices, a response including the information indicating the condition regarding the communication in the other communication devices; a selecting unit configured to select, based on the response received by the receiving unit, a device to be requested to transfer the communication of the communication device from a transmission source device of the response, and to select a communication method to be used for transferring, in the device; and a performing unit configured to perform connection establishment processing including requesting the device selected by the selecting unit to relay the communication of the communication device, by performing communication between the device and the predetermined device using the communication method selected by the selecting unit.

A relay device according to one aspect of the present invention is a relay device that relays communication wirelessly between a communication device and a predetermined device, the relay device comprising: a receiving unit configured to receive, from the communication device, a request signal requesting information indicating a condition regarding communication with the predetermined device in each of one or more communication methods in the relay device; and a transmitting unit configured to transmit, to the communication device, a response including the information indicating the condition regarding the communication in the relay device.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain principles of the invention.

DESCRIPTION OF THE EMBODIMENTS

Figure 1:
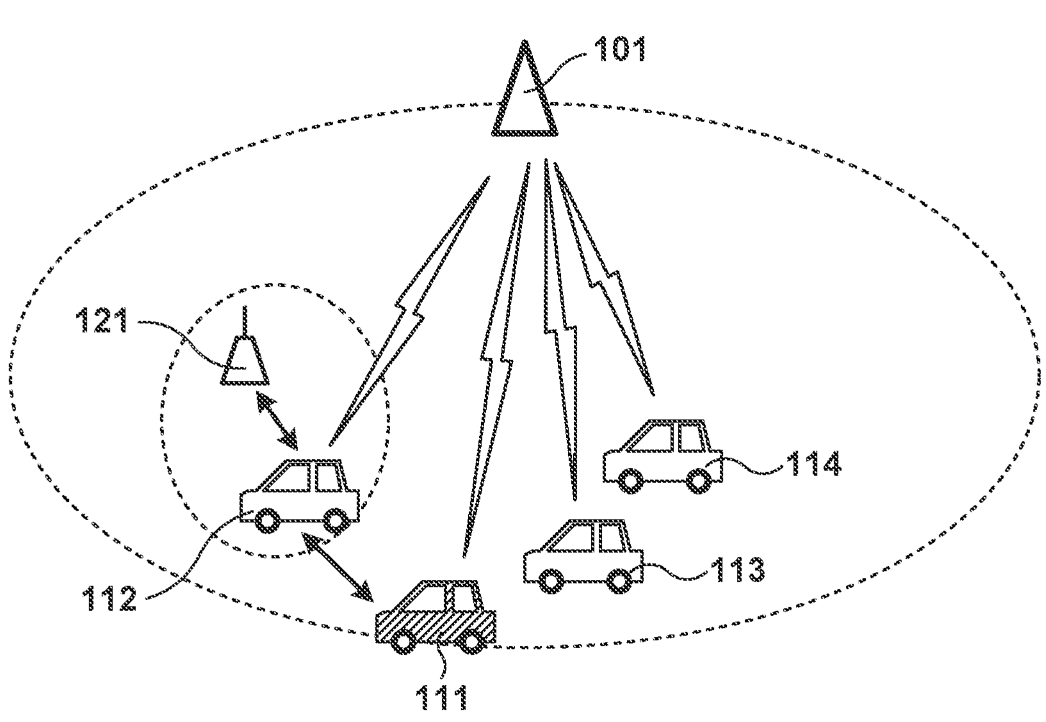
FIG. 1 is a diagram illustrating a system configuration example.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

(System Configuration)

FIG. 1 illustrates a configuration example of a system in the present embodiment. The present system is a wireless communication system in which vehicles 111 to 114, which are capable of performing wireless communication, connect to a predetermined network such as the Internet, and perform communication. The vehicles 111 to 114 according to the present embodiment connect to a base station 101 of a cellular communication system, for example, and perform communication with a predetermined communication device. In addition, the vehicles 111 to 114 are, for example, configured to be capable of communicating with each other by connecting to each other in a communication method different from the cellular communication method for communicating with the base station 101. Here, the communication method different from the cellular communication method is, for example, any communication method of cellular Vehicle-to-Everything (V2X), wireless LAN, Dedicated Short Range Communications (DSRC), and Bluetooth (registered trademark). Note that although the cellular V2X is one aspect of the cellular communication method, it is not used for the communication between the base station and the terminal (that is, the vehicle 111 to the vehicle 114), but is used for the communication between a device other than the base station and the terminal (the vehicle 111 to the vehicle 114). Therefore, these communication methods are treated as different communication methods throughout the present embodiment and the scope of claims. Note that a combination of the cellular communication method and any other communication method is an example, and the vehicles 111 to 114 are configured to connect to a first device such as the base station 101 in a first communication method, and to be connectable with each other in a second communication method different from the first communication method. Note that in FIG. 1, only one base station 101 and four vehicles 111 to 114 are illustrated, but it is needless to say that a large number of these devices can be present.

By using the second communication method, the vehicles 111 to 114 are capable of performing, for example, not only vehicle-to-vehicle communication but also communication with another device such as, for example, an access point of a wireless LAN. In one example, it is assumed that the vehicle 112 is present in a location where it is possible to communicate with a predetermined device 121, which is fixed in a communication method other than the cellular communication method, and is in a state in which it is possible to communicate with the predetermined device 121 through a wireless LAN. Note that the vehicle 112 is connectable to communicate with further another device other than the predetermined device 121 in a communication method such as a wireless LAN or Bluetooth. In addition, the vehicle 113 and the vehicle 114 are also connectable to communicate with one or more other devices in the surroundings by using a communication method corresponding to each device, depending on the location. Note that FIG. 1 illustrates an example in which the vehicle 112 is directly connectable to the predetermined device 121, which is fixed, but there is no intention of being limited to this. For example, the vehicle 112 may be capable of communicating with the predetermined device 121, which is fixed, through a wireless communication device such as further another vehicle. The same applies to other vehicles.

By performing cellular communication with the base station 101, the vehicles 111 to 114 are capable of transmitting, for example, information that has been acquired by sensors of the respective vehicles to a device such as a predetermined information processing server. The information processing server is capable of performing various types of processing such as control for automated driving with this information. In addition, by performing the cellular communication with the base station 101, the vehicles 111 to 114 are capable of acquiring various types of information such as driving control information and service information in accordance with the locations of the vehicles from a server that holds, for example, predetermined information. On the other hand, in an environment in which a large number of vehicles communicate in parallel, the communication capacity that can be provided by the base station 101 may be insufficient. For this reason, in the present embodiment, for example, the communication of the vehicle 111 is offloaded onto another device through the other vehicles 112 to 114. Note that the communication of the vehicle 112 to the vehicle 114 can be similarly offloaded through another vehicle. However, here, a description will be given by focusing on offloading the communication of the vehicle 111.

The vehicle 111 establishes a connection with a vehicle in the surroundings, and communicates with a predetermined device such as a server on the Internet through the connection. For this purpose, the vehicle 111 transmits a connection request for requesting another vehicle in the surroundings to relay the communication, and establishes a connection. At this time, the vehicle 111 can, for example, establish a connection with another vehicle having good wireless quality of communication with the vehicle 111 in the second communication method. In one example, the vehicle 111 can establish a connection with the vehicle 112 in the second communication method to cause the vehicle 112 to transfer the communication of the self-device. In this situation, the vehicle 112 is capable of using, for example, a plurality of communication methods, and the communication performance can be greatly changed depending on which communication method the vehicle 112 uses. For example, there can be a communication method in which an achievable maximum communication rate is insufficient to transfer communication of the vehicle 111. In addition, in a case where a communication method in which the achievable maximum communication rate is sufficiently large is used, but in a state in which communication in such a communication method is congested, the communication of the vehicle 111 cannot be transferred by using such a communication method.

In the present embodiment, in consideration of such circumstances, a communication device (for example, the vehicle 111) transmits a request signal for requesting one or more other communication devices capable of relaying the communication of the self-device, for information indicating a condition regarding communication with a predetermined communication device in each of one or more communication methods in such one or more other communication devices (for example, the vehicle 112 to the vehicle 114). Note that the predetermined communication device is, for example, a wireless communication device (for example, the predetermined device 121) capable of accessing a device that terminates communication such as the Internet, and a different predetermined communication device can be set for every communication method. Upon receiving the request signal, another communication device transmits, to the communication device, a response including the information indicating the condition regarding the communication with the predetermined communication device with regard to at least any (in some cases, each of all available communication methods) of the communication methods available to the self-device. The communication device receives the response from at least any of the one or more other communication devices, selects a device (that is, a relay device) to be requested to transfer the communication of the communication device itself, from the one or more other communication devices (in one example, another communication device that is a transmission source of the response), based on the response, and selects a communication method that should be used for the transfer in the device that has been selected. Then, the communication device performs connection establishment processing including requesting the device that has been selected to relay the communication of the communication device using the communication method that has been selected.

In this manner, in the present embodiment, the communication device acquires, from the other communication devices to be candidates each having a possibility that the relay is requested, whether it is possible to communicate in each of the one or more communication methods available to the other communication devices and information of a communication capacity about whether a sufficient communication capacity is obtainable through the communication. Then, the communication device designates a communication method between another communication device and a predetermined communication device, and requests for relaying the communication, so that a communication device suitable for relaying the communication of the self-device connects to the predetermined communication device in a communication method suitable for the communication device to relay the communication of the self-device. According to this, it is possible to prevent degradation in the performance of communication between the communication device and the predetermined communication device, resulting from the communication between another communication device and the predetermined communication device.

Note that in one example, the request signal is transmitted in a broadcast manner, and is simultaneously transmitted to other communication devices in the surroundings of the communication device. Accordingly, the communication device is capable of completing information collection from other communication devices in a short period of time. In addition, the request signal may include information indicating requesting for relaying the communication of the communication device. Note that only the information indicating requesting for relaying the communication of the communication device may be transmitted to other communication devices. That is, the information explicitly indicating that the information of the condition regarding the communication in every communication method is requested does not have to be included in the request signal, and the information indicating requesting for relaying the communication may implicitly indicate that the information of the condition regarding the communication in every communication method is requested.

In one example, the communication method includes at least one of a cellular communication method, a wireless LAN communication method, and a Bluetooth communication method. Note that in addition to or instead of these methods, any other communication method may be used. Note that in the present embodiment, the cellular communication method is available to both the vehicle 111 that requests the relay transmission and the vehicle 112 to the vehicle 114, which can be requested for the relay transmission. However, it is supposed that, for example, the wireless quality of the cellular communication method in the vehicle 112 to the vehicle 114 is sufficiently better than that in the vehicle 111, and it is possible to significantly reduce the resource usage amount by causing the vehicle 112 to the vehicle 114 to relay the communication of the vehicle 111 rather than the vehicle 111 directly communicating with the base station 101. For this reason, also with regard to the cellular communication method available to the vehicle 111, the vehicle 112 to the vehicle 114 can transmit information indicating the condition regarding such a communication method to the vehicle 111.

Note that in requesting for the information of the condition regarding the communication, the communication device may transmit a request signal that designates a communication method to be reported as the information. In this case, with regard to the designated communication method, another communication device transmits, to the communication device, a response including the information indicating the condition regarding the communication with the predetermined communication device that is an offload target in the designated communication method. According to this, for example, in view of the communication method standards, it is possible to prevent reporting on the information about a communication method that is incapable of satisfying the communication performance requested by the communication device, and waste of wireless resources can be prevented. In addition, the communication device may designate information indicating the communication performance requested by the communication of the self-device, in the request signal. In this case, with regard to the communication method that satisfies the designated communication performance, another communication device transmits, to the communication device, information indicating the condition regarding the communication with the predetermined communication device that is the offload target in the communication method. Note that in this case, another communication device does not report, for example, a communication method in which no device that is an offload target is present in the surroundings or a communication method for which it has been determined that satisfying the requested communication performance is not possible, based on the wireless quality. In one example, another communication device does not transmit a response, in a case where it is not possible to satisfy the requested communication performance in any of the communication methods available to the self-device. Note that another communication device may transmit, to the communication device, a response including information indicating whether the requested communication performance is satisfied, with regard to each of one or more communication methods. According to this, since another communication device reports information only about the communication method capable of satisfying the communication performance requested by the communication device, it becomes possible to prevent waste of wireless resources.

In one example, the information of the condition regarding the communication in a certain communication method includes information about the wireless quality with a predetermined communication device in another communication device, in a case where such a communication method is used. The wireless quality can include, for example, received signal strength, a signal to noise ratio (SNR), a signal to interference plus noise ratio (SINR), reference signal received power (RSRP), or reference signal received quality (RSRQ) in such another communication device. Accordingly, the communication device becomes capable of selecting a communication method having sufficiently good wireless quality as a communication method that should be used by another communication device for a relay target.

In addition, in one example, the information of the condition regarding the communication in a certain communication method can include information indicating whether another communication device has already established a connection using such a communication method. According to this, the communication device is capable of identifying, for example, another communication device having a communication method in which the connection has been already established, as a device capable of promptly relaying the communication of the self-device. Therefore, for example, in a case where the communication device performs the communication that should be promptly relayed, it is possible to determine to request a communication device having the communication method in which such a connection has been established to relay the communication in such a communication method.

In addition, the information of the condition regarding the communication in a certain communication method may include information indicating a congestion state (congestion degree) of the communication in such a communication method. According to this, by trying not to select the communication method in the congestion state (congested), the communication device becomes capable of selecting another communication device capable of stably relaying the communication of the self-device and the communication method that should be used.

Note that the communication device can wait for a response from each of the other communication devices over a predetermined period, and can select a device to be requested to transfer the communication and a communication method that should be used in transferring by such a device, based on the response that has been received during the predetermined period. Accordingly, the communication device is capable of appropriately selecting a device suitable for relaying the communication from the other communication devices in the surroundings of the self-device.

In addition, in a case where the communication device receives a response including information indicating the communication method capable of satisfying the communication performance that should be satisfied in relaying the communication of the self-device, the communication device can select a transmission source device of the response that has been received, as a device to be requested to transfer the communication, without waiting for receiving a response from another device, and can select the communication method indicated in the response that it is possible to satisfy the communication performance, as a communication method that should be used. According to this, within a short period of time, after confirming that another communication device suitable for relaying is present, it becomes possible to perform the connection establishment processing with such another communication device. Therefore, it becomes possible to promptly start the communication between the communication device and the predetermined communication device.

Note that, for example, in a case where there is no predetermined communication device that can be an offload target of the communication of the communication device, another communication device can try not to transmit the report. According to this, the communication device can treat only the other communication devices that are transmission sources of the responses as candidates for the relay device, and can select a device to be requested to relay the communication for implementation from them.

Hereinafter, configurations and operations of the vehicle 111 to the vehicle 114 that perform such processing will be described. Note that in the present embodiment, the processing to be performed by the vehicle 111 to the vehicle 114 is described. However, the "vehicle" is merely one aspect of a communication device, and the discussion in the present embodiment is applicable to a wireless communication device in any aspect.

(Device Configuration)

Figure 2:
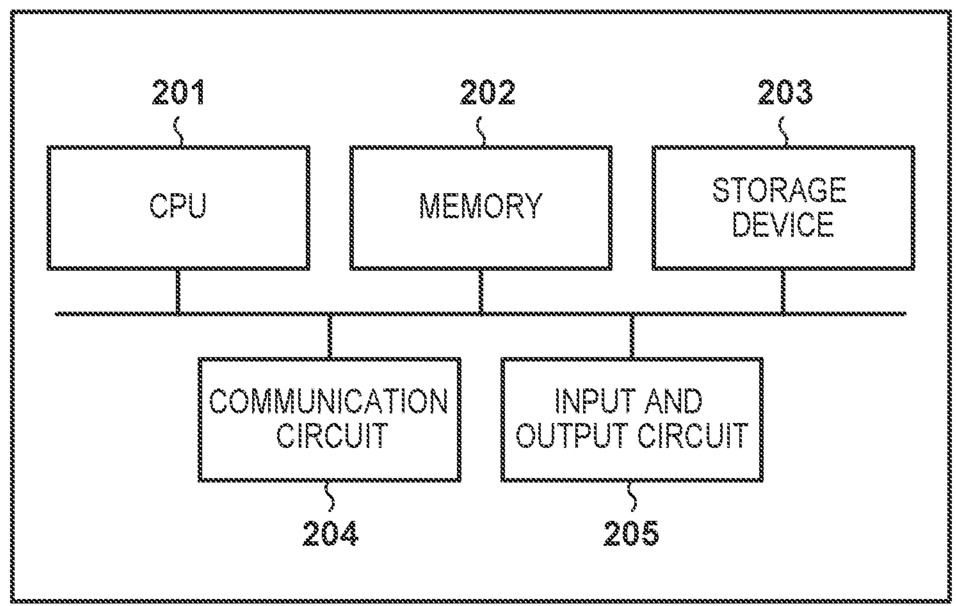
FIG. 2 is a diagram illustrating a hardware configuration example of a communication device.

FIG. 2 illustrates a hardware configuration example of the communication device mounted on the vehicle 111 to the vehicle 114 in the present embodiment. The communication device includes a general-purpose computer in one example, and the computer includes, for example, a CPU 201, a memory 202, a storage device 203, a communication circuit 204, and an input and output circuit 205. Note that FIG. 2 illustrates a configuration example of hardware according to the present embodiment, and illustrations of the other configurations are omitted. The CPU 201 is, for example, a central processing unit (CPU) that performs processing to be described later and that controls the entire device, by executing a program stored in the memory 202. Note that the CPU 201 can be substituted by any one or more processors such as a micro processing unit (MPU) or an application-specific integrated circuit (ASIC). The memory 202 holds a program for causing the communication device to perform various types of processing, and functions as a work memory at the time of executing the program. In one example, the memory 202 is a random access memory (RAM) or a read-only memory (ROM). The storage device 203 is, for example, a detachable external storage device, a built-in hard disk drive, or the like, and holds various types of information. The communication circuit 204 performs signal processing related to communication, acquires various types of information from an external device through a communication network, and transmits the various types of information to the external device. Note that the information that has been acquired by the communication circuit 204 can be stored in, for example, the memory 202 or the storage device 203. Note that the communication device can include a plurality of communication circuits 204. The input and output circuit 205 controls, for example, outputs of screen information to be displayed on a display device, not illustrated, audio information to be output from a speaker, and receiving of user inputs via a keyboard, a pointing device, or the like. Note that the input and output circuit 205 may control a device that integrally inputs into and outputs from a touch panel or the like. Note that the configuration of FIG. 2 is an example, and for example, the communication device may include dedicated hardware for performing the above-described processing.

Figure 3:
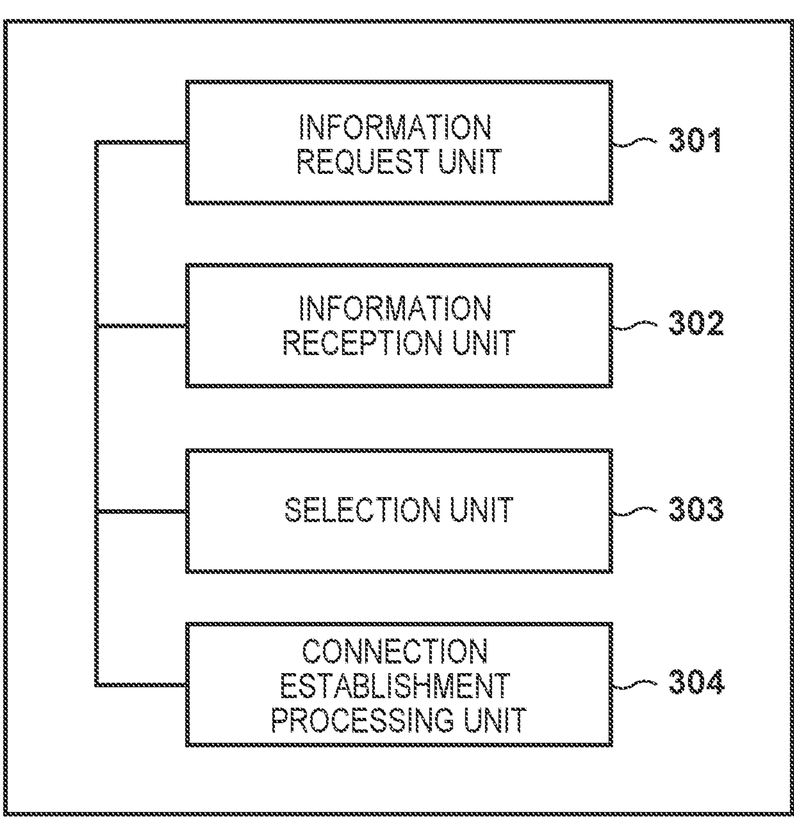
FIG. 3 is a diagram illustrating a functional configuration example of the communication device that requests for relaying.

FIG. 3 illustrates a functional configuration example of a communication device that requests for relaying communication. Note that out of the vehicle 111 to the vehicle 114, in the present embodiment, the description is given with regard to a case where the vehicle 111 is a communication device that requests for relaying the communication. However, the vehicle 112 to the vehicle 114 can also operate as a communication device that requests for relaying the communication, and thus can have functions as illustrated in FIG. 3. The communication device includes, for example, an information request unit 301, an information reception unit 302, a selection unit 303, and a connection establishment processing unit 304, as its functions. Note that these functional units may be implemented, for example, by the CPU 201 executing a program stored in the memory 202 or the storage device 203, or may be implemented by dedicated hardware.

Note that since the detailed operations of the respective functional units have been described above, only the functions are outlined here, and the detailed descriptions are omitted.

The information request unit 301 transmits, to one or more other communication devices, a request signal for requesting information indicating a condition regarding communication between the one or more other communication devices and a predetermined communication device in each of one or more communication methods. As a response to the request signal that has been transmitted by the information request unit 301, the information reception unit 302 receives, from at least any of the one or more other communication devices, the information indicating the condition regarding the communication in each of the one or more communication methods, in such a device. The selection unit 303 selects a device to be requested to transfer the communication of the self-device, for example, from the other communication devices that are transmission sources of responses, based on the information that has been received, and further selects a communication method that should be used with a predetermined communication device to transfer the communication of the communication device, in such a device. The connection establishment processing unit 304 performs connection establishment processing including requesting the device that has been selected by the selection unit 303 to perform communication between such a device and the predetermined communication device using the communication method that has been selected by the selection unit 303 so as to relay the communication of the communication device. That is, the connection establishment processing unit 304 also makes a request related to the communication between another communication device and the predetermined communication device, while performing the connection establishment processing between the communication device and another communication device.

Figure 4:
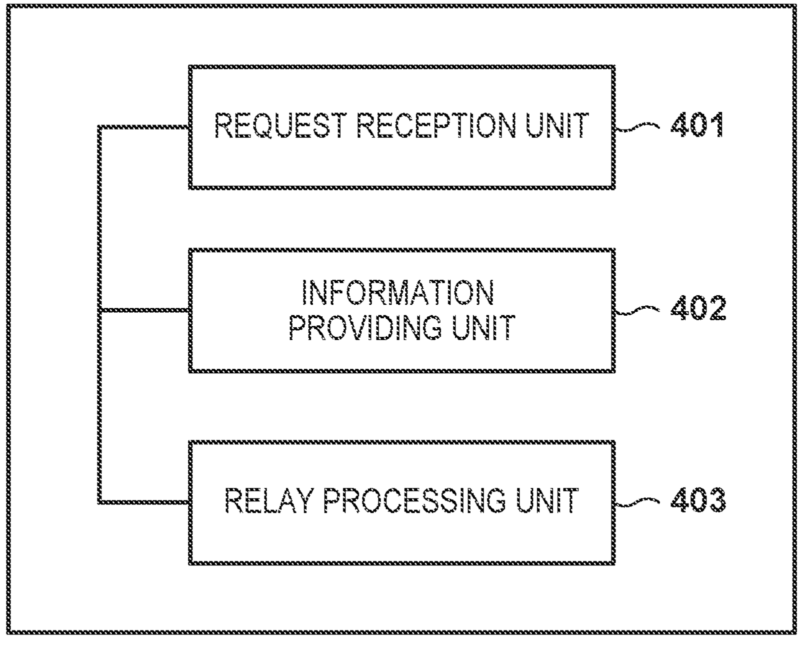
FIG. 4 is a diagram illustrating a functional configuration example of the communication device that enables relaying.

FIG. 4 illustrates a functional configuration example of a communication device that receives a request for relaying the communication and that operates as a relay device. Note that out of the vehicle 111 to the vehicle 114, in the present embodiment, the description is given with regard to a case where the vehicle 112 to the vehicle 114 are communication devices each of which operates as a relay device. However, the vehicle 111 is also capable of operating as a communication device that operates as the relay device, and thus can have functions as illustrated in FIG. 4. The communication device includes, for example, a request reception unit 401, an information providing unit 402, and a relay processing unit 403, as its functions. Note that these functional units may be implemented, for example, by the CPU 201 executing a program stored in the memory 202 or the storage device 203, or may be implemented by dedicated hardware. Note that since the detailed operations of the respective functional units have been described above, only the functions are outlined here, and the detailed descriptions are omitted.

The request reception unit 401 receives a request signal requesting information indicating a condition regarding the communication between the communication device and a predetermined communication device in each of one or more communication methods, from other communication devices in the surroundings. Note that the request signal may be a signal indicating requesting for relaying the communication of a transmission source device, and can be a signal in any format having a meaning of requesting information indicating a condition regarding the communication in each of one or more communication methods between a device that has received the signal and a predetermined communication device. In response to receiving the request signal, the information providing unit 402 transmits a response including the information indicating the condition regarding the communication with the predetermined communication device in each of one or more communication methods in the self-device. The relay processing unit 403 receives a signal including information of requesting for relaying the communication of a device from the device that has received the above response, the signal designating a communication method that should be used in the communication with the predetermined communication device. Then, the relay processing unit 403 establishes a connection with a transmission source device of the signal, and conducts control so as to relay the communication between the transmission source device of the signal and the predetermined communication device, by using the communication with a predetermined communication device in the communication method that has been designated. Note that the relay processing unit 403 establishes a connection with the device that is the transmission source device of the above-described signal, by using, for example, the communication method used when the request signal that has been received by the request reception unit 401 was transmitted.

(Flow of Processing)

Next, an example of a flow of processing performed by the above-described communication system will be described. Here, it is assumed that the vehicle 111 selects the vehicle 112 from the vehicle 112 to the vehicle 114, as the relay device, and a communication method used with the predetermined device 121 is designated as a communication method that should be used by the vehicle 112. Note that details of each process to be described later have been described above. Therefore, in the description here, only the flow of the processing is outlined, and the detailed description is not repeated. The present processing is implemented by, for example, the CPU 201 executing a program stored in the memory 202 or the storage device 203.

Figure 5:
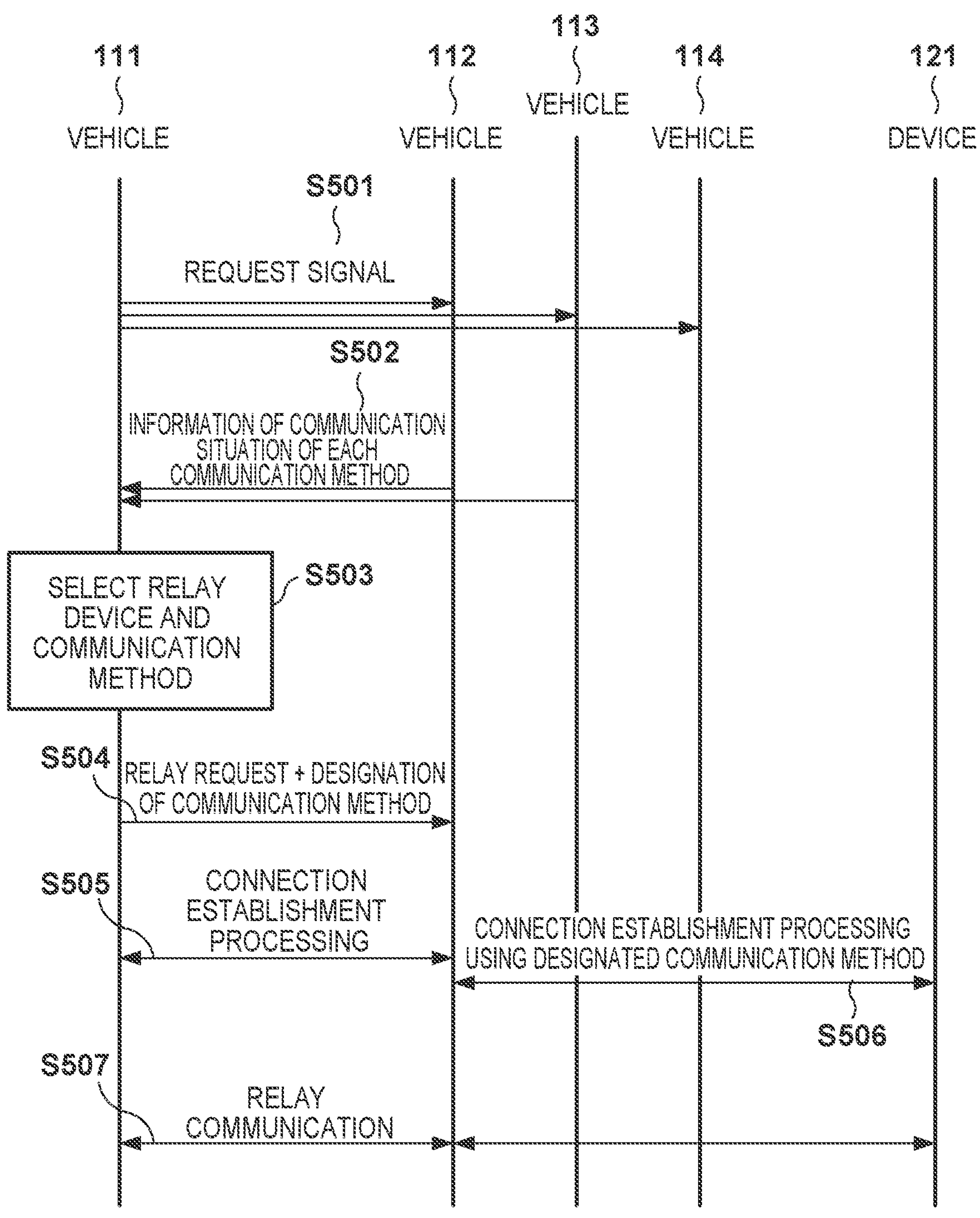
FIG. 5 is a diagram illustrating an example of a flow of processing performed in the system.

In the present system, first, the vehicle 111 transmits, to each the vehicle 112 to the vehicle 114, a request signal for requesting information indicating a condition regarding communication between such a vehicle and a predetermined device that enables communication with a device (for example, a server on the Internet) to be a communication partner of the vehicle 111, in each of one or more communication methods available to such a vehicle (S501). Upon receiving this request signal, the vehicle 112 to the vehicle 114 each identify a communication condition with a predetermined device capable of reaching the communication partner of the vehicle 111, with regard to each of the communication methods available to the self-device, and transmits a response including the information regarding the communication condition to the vehicle 111 (S502). Note that, for example, in a case where the vehicle 112 to the vehicle 114 cannot find a predetermined device capable of reaching the communication partner of the vehicle 111 in any communication methods, the response of S502 does not have to be transmitted. For example, FIG. 5 illustrates an example in which the vehicle 114 does not transmit the response. Thereafter, the vehicle 111 selects a device that relays the communication of the self-device and a communication method that should be used in such a device, based on the received information (S503). Note that, for example, in a case where the vehicle 111 receives the response from a vehicle capable of communicating with a predetermined device in a communication method by which it is possible to obtain the communication performance requested in the communication of the self-device, the vehicle 111 may select the vehicle that is a transmission source of the response as the relay device, without waiting for receiving the response from another vehicle. Here, as described above, it is assumed that the vehicle 111 selects the vehicle 112 as the relay device, and selects one communication method (for example, a wireless LAN communication method) capable of communicating with the predetermined device 121, as a communication method that should be used by the vehicle 112.

In response to the selection, the vehicle 111 transmits a relay request that designates the selected communication method to the vehicle 112 (S504). Upon receiving this relay request, the vehicle 112 establishes a connection with the vehicle 111 (S505). Here, it is assumed that the vehicle 112 establishes the connection with the vehicle 111, by using, for example, the communication method in which the signal of S501 has been transmitted and received, and in the connection establishment processing, a procedure defined in the communication standards of the communication method is performed. In addition, the vehicle 112 establishes a connection with the predetermined device 121 in the communication method designated in the relay request (S506). Note that in a case where the vehicle 112 has already established the connection with the predetermined device 121, the processing of S506 may be omitted.

Note that the vehicle 112 identifies the communication condition in each communication method, when providing the information in S502, but can establish a connection with a partner device at the time of identifying the communication condition in the designated communication method. That is, in the present embodiment, it is assumed that the vehicle 112 identified the condition regarding the communication with the predetermined device 121 with regard to a certain communication method, and transmitted the identified information to the vehicle 111 in S502. Note that, for example, when transmitting the information indicating the condition regarding the communication in each communication method to the vehicle 111, the vehicle 112 to the vehicle 114 may also notify information indicating the partner device at the time of identifying the condition regarding the communication. In this case, the vehicle 111 may notify the relay device (the vehicle 112) that has been selected of information indicating the predetermined communication device that is a connection target. In this situation, the vehicle 111 may also notify of the communication method that should be used, or may only notify of the communication method to be implicitly used by indicating the information of the connection target, and does not have to explicitly notify of the communication method that should be used.

After both the connection with the vehicle 111 and the connection with the predetermined device 121 are established, the vehicle 112 starts relaying the communication of the vehicle 111 (S507).

In this manner, the vehicle 111 selects another vehicle (the vehicle 112) capable of relaying the communication of the self-device with sufficient quality, and further identifies, in such another vehicle that has been selected, a communication method that should be used in the communication to a predetermined communication device (the predetermined device 121) as a relay target. Accordingly, the device that has been selected as the relay device relays in the communication method capable of achieving the communication performance requested in the communication of the vehicle 111, so that the vehicle 111 becomes capable of communicating with sufficient communication performance.

Summary of Embodiments

1. A communication device according to the embodiment above is:

a communication device that performs communication wirelessly, the communication device comprising:

a requesting unit configured to transmit, to one or more other communication devices, a request signal requesting information indicating a condition regarding communication between a predetermined device and the other communication devices, in each of one or more communication methods in the one or more other communication devices, the predetermined device being different from the communication device;

a receiving unit configured to receive, from at least any of the one or more other communication devices, a response including the information indicating the condition regarding the communication in the other communication devices;

a selecting unit configured to select, based on the response received by the receiving unit, a device to be requested to transfer the communication of the communication device from a transmission source device of the response, and to select a communication method to be used for transferring, in the device; and a performing unit configured to perform connection establishment processing including requesting the device selected by the selecting unit to relay the communication of the communication device, by performing communication between the device and the predetermined device using the communication method selected by the selecting unit.

According to this embodiment, when the communication device requests the other communication devices to relay the communication with the predetermined device, the communication device is capable of determining another communication device that should relay in consideration of the communication methods available to each of the other communication devices, and is capable of designating a communication method that should be used by such another communication device to communicate with the predetermined device. According to this, out of the communication methods available to the other communication devices, it is possible to cause the communication device to use a communication method suitable for transferring the communication, so that the communication device can communicate with the predetermined device in a good condition.

2. In the embodiment according to 1 above, the requesting unit designates the one or more communication methods in the request signal, and requests the one or more other communication devices for the information indicating the condition regarding the communication between the other communication devices and the predetermined device in the communication method designated.

According to this embodiment, the information about the communication method that should be provided by the other communication devices is designated beforehand. Therefore, it is possible to suppress an amount of information that should be notified from the other communication devices to the communication device. In one example, transmission and reception of information about a communication method, in which requested communication performance is not obtainable even with the best achievable communication quality, can be omitted.

3. In the embodiment according to 1 or 2 above, the requesting unit designates, in the request signal, communication performance requested in the communication of the communication device, and requests transmission of the information indicating the condition regarding the communication with the predetermined device in each of the one or more communication methods, and the receiving unit receives the response from the other communication devices capable of communicating with the predetermined device in a communication method that satisfies the communication performance.

According to this embodiment, the information that should be provided for the communication device by the other communication devices is limited to the information about the communication method that can satisfy the communication performance requested by the communication device. Therefore, the communication amount related to the provision of this information can be suppressed.

4. In the embodiment according to any one of 1 to 3 above, the information indicating the condition regarding the communication includes information regarding wireless quality between the other communication devices and the predetermined device in each of the one or more communication methods.

According to this embodiment, the communication device is capable of recognizing which communication method should be used by another communication device to obtain sufficient wireless quality.

5. In the embodiment according to 4 above, the wireless quality includes received signal strength, a signal to noise ratio, a signal to interference plus noise ratio, reference signal received power, or reference signal received quality in the one or more other communication devices.

According to this embodiment, the communication device is capable of objectively recognizing the wireless quality obtained in the other communication devices.

6. In the embodiment according to any one of 1 to 5 above, the information indicating the condition regarding the communication includes information indicating whether a connection is established between the other communication devices and the predetermined device using each of the one or more communication methods.

According to this embodiment, the communication device is capable of selecting another communication device that has already established the connection with the predetermined device and that has high reliability of enabling the relay communication, and a communication method that should be used.

7. In the embodiment according to any one of 1 to 6 above, the information indicating the condition regarding the communication includes information indicating a congestion state of the communication using each of the one or more communication methods.

According to this embodiment, it is possible to prevent the communication device from selecting another communication device that is incapable of relaying the communication with sufficient quality because of congestion, as a device that relays the communication of the self-device.

8. In the embodiment according to any one of 1 to 7 above, the one or more communication methods include a cellular communication method, a wireless LAN communication method, or a Bluetooth communication method.

According to this embodiment, a procedure according to each of the above-described embodiments is applicable, presupposing a widely used communication method.

9. In the embodiment according to any one of 1 to 8 above, the receiving unit waits for the response for a predetermined period of time, and the selecting unit selects the device to be requested to transfer the communication, based on the response received during the predetermined period.

According to this embodiment, the communication device is capable of selecting another communication device that can achieve more appropriate communication performance and a communication method that should be used, from responses that have been received within a predetermined period.

10. In the embodiment according to any one of 1 to 8 above, the selecting unit selects the transmission source device of the response received as the device to be requested to transfer the communication, without waiting for receiving the response from another device, based on receiving the response including the information indicating the condition regarding the communication indicating that performance requested in transferring the communication of the communication device to the predetermined device is satisfiable.

According to this embodiment, the communication device is capable of recognizing that a device that can satisfy the performance requested by the self-device, and is then capable of requesting such a device to relay the communication in a short period of time.

11. In the embodiment according to any one of 1 to 10 above, the requesting unit transmits the request signal in a broadcast manner.

According to this embodiment, it is possible to simultaneously request information from each of the other communication devices present in the surroundings.

12. In the embodiment according to any one of 1 to 11 above, the request signal includes information indicating requesting for relaying the communication of the communication device.

According to this embodiment, for example, by configuring not to transmit a response from another communication device that is incapable of relaying the communication or that rejects relaying the communication of the communication device, it is possible to prevent the communication device from performing unnecessary processing, such that the communication device selects such a device, and after establishes a connection, the relay is rejected.

13. In the embodiment according to any one of 1 to 12 above, the communication device is a vehicle.

According to this embodiment, although the other communication devices in the surroundings change in accordance with movements of vehicles, the communication device is capable of appropriately selecting a relay device that should perform relay transmission and a communication method that should be used by the relay device, regardless of the change.

14. A relay device according to embodiments above is:

a relay device that relays communication wirelessly between a communication device and a predetermined device, the relay device comprising:

a receiving unit configured to receive, from the communication device, a request signal requesting information indicating a condition regarding communication with the predetermined device in each of one or more communication methods in the relay device; and a transmitting unit configured to transmit, to the communication device, a response including the information indicating the condition regarding the communication in the relay device.

According to this embodiment, by notifying the communication device of the communication method and the condition of the communication in a case where a relay device performs communication between the communication device and the predetermined device, the communication device is enabled to select a relay device suitable for the communication with the predetermined device, and the communication device is enabled to recognize which communication method should be used by the relay device to enable the relay communication requested by the communication device. Accordingly, the communication device becomes capable of selecting a communication method suitable for transferring the communication of the communication device, from the communication methods available to the relay device.

15. In the embodiment according to 14 above, the request signal includes information designating the one or more communication methods, and the transmitting unit transmits the response including the information indicating the condition regarding the communication with the predetermined device in a communication method designated.

According to this embodiment, since the information of the communication method that should be provided by the relay device is designated beforehand, the amount of information that should be notified from the relay device to the communication device can be suppressed. In one example, transmission and reception of information about a communication method, in which requested communication performance is not obtainable even with the best achievable communication quality, can be omitted.

16. In the embodiment according to 14 above, the request signal includes information designating communication performance requested for the communication of the communication device, and the transmitting unit transmits the response including the information indicating the condition regarding the communication with the predetermined device with regard to a communication method that satisfies the communication performance.

According to this embodiment, since the information that should be provided for the communication device by the relay device is limited to the information of the communication method that can satisfy the communication performance requested by the communication device, the communication amount related to the provision of this information can be suppressed.

17. In the embodiment according to any one of 14 to 16 above, the information indicating the condition regarding the communication includes information regarding wireless quality with the predetermined device in each of the one or more communication methods.

According to this embodiment, the communication device is capable of recognizing which communication method should be used by the relay device to obtain sufficient wireless quality.

18. In the embodiment according to 17 above, the wireless quality includes received signal strength, a signal to noise ratio, a signal to interference plus noise ratio, reference signal received power, or reference signal received quality, in the relay device.

According to this embodiment, the communication device is capable of objectively recognizing the wireless quality obtained in the relay device.

19. In the embodiment according to any one of 14 to 18 above, the information indicating the condition regarding the communication includes information indicating whether a connection is established with the predetermined device using each of the one or more communication methods.

According to this embodiment, the communication device is capable of selecting a communication method in which the connection has been already established between the relay device and the predetermined device, and which has high reliability of enabling the relay communication.

20. In the embodiment according to any one of 14 to 19 above, the information indicating the condition regarding the communication includes information indicating a congestion state of the communication using each of the one or more communication methods.

According to this embodiment, it is possible to prevent the communication device from selecting another communication device that is incapable of relaying the communication with sufficient quality because of congestion.

21. In the embodiment according to any one of 14 to 20 above, the one or more communication methods include a cellular communication method, a wireless LAN communication method, or a Bluetooth communication method.

According to this embodiment, a procedure according to each of the above-described embodiments is applicable, presupposing a widely used communication method.

22. In the embodiment according to any one of 14 to 21 above, the relay device is a vehicle.

According to this embodiment, although the communication performance of every communication method between a vehicle and a predetermined device changes in accordance with a movement of the vehicle, the communication device is capable of appropriately selecting a relay device that should perform relay transmission and a communication method that should be used by the relay device, in consideration of the change.

23. A control method according to the embodiment above is:

a control method performed by a communication device that performs communication wirelessly, the control method comprising:

transmitting, to one or more other communication devices, a request signal requesting information indicating a condition regarding communication between a predetermined device and the other communication devices, in each of one or more communication methods in the one or more other communication devices, the predetermined device being different from the communication device;

receiving, from at least any of the one or more other communication devices, a response including the information indicating the condition regarding the communication in the other communication devices;

selecting, based on the response received, a device to be requested to transfer the communication of the communication device from a transmission source device of the response, and selecting a communication method to be used for transferring, in the device; and performing connection establishment processing including requesting the device selected to relay the communication of the communication device, by performing communication between the device and the predetermined device using the communication method selected.

According to this embodiment, when the communication device requests the other communication devices to relay the communication with the predetermined device, the communication device is capable of determining another communication device that should relay in consideration of the communication methods available to each of the other communication devices, and is capable of designating a communication method that should be used by such another communication device to communicate with the predetermined device. According to this, out of the communication methods available to the other communication devices, it is possible to cause the communication device to use a communication method suitable for transferring the communication, so that the communication device can communicate with the predetermined device in a good condition.

24. A control method according to the embodiment above is:

a control method performed by a relay device that relays communication wirelessly between a communication device and a predetermined device, the control method comprising:

receiving, from the communication device, a request signal requesting information indicating a condition regarding communication with the predetermined device in each of one or more communication methods in the relay device; and transmitting, to the communication device, a response including the information indicating the condition regarding the communication in the relay device.

According to this embodiment, by notifying the communication device of the communication method and the condition of the communication in a case where a relay device performs communication between the communication device and the predetermined device, the communication device is enabled to select a relay device suitable for the communication with the predetermined device, and the communication device is enabled to recognize which communication method should be used by the relay device to enable the relay communication requested by the communication device. Accordingly, the communication device becomes capable of selecting a communication method suitable for transferring the communication of the communication device, from the communication methods available to the relay device.

25. A program according to the embodiment above is:

a program for causing a computer included in a communication device that performs communication wirelessly to:

transmit, to one or more other communication devices, a request signal requesting information indicating a condition regarding communication between a predetermined device and the other communication devices, in each of one or more communication methods in the one or more other communication devices, the predetermined device being different from the communication device;

receive, from at least any of the one or more other communication devices, a response including the information indicating the condition regarding the communication in the other communication devices;

select, based on the response received, a device to be requested to transfer the communication of the communication device from a transmission source device of the response, and select a communication method to be used for transferring, in the device; and perform connection establishment processing including requesting the device selected to relay the communication of the communication device, by performing communication between the device and the predetermined device using the communication method selected.

According to this embodiment, when the communication device requests the other communication devices to relay the communication with the predetermined device, the communication device is capable of determining another communication device that should relay in consideration of the communication methods available to each of the other communication devices, and is capable of designating a communication method that should be used by such another communication device to communicate with the predetermined device. According to this, out of the communication methods available to the other communication devices, it is possible to cause the communication device to use a communication method suitable for transferring the communication, so that the communication device can communicate with the predetermined device in a good condition.

26. A program according to the embodiment above is:

a program for causing a computer included in a relay device that relays communication wirelessly between a communication device and a predetermined device to:

receive, from the communication device, a request signal requesting information indicating a condition regarding communication with the predetermined device in each of one or more communication methods in the relay device; and transmit, to the communication device, a response including the information indicating the condition regarding the communication in the relay device.

According to this embodiment, by notifying the communication device of the communication method and the condition of the communication in a case where a relay device performs communication between the communication device and the predetermined device, the communication device is enabled to select a relay device suitable for the communication with the predetermined device, and the communication device is enabled to recognize which communication method should be used by the relay device to enable the relay communication requested by the communication device. Accordingly, the communication device becomes capable of selecting a communication method suitable for transferring the communication of the communication device, from the communication methods available to the relay device.

The invention is not limited to the foregoing embodiments, and various variations/changes are possible within the spirit of the invention.

What is claimed is:

1. A communication device that performs communication wirelessly, the communication device comprising:

one or more processors; and a memory storing instructions that, when executed by the one or more processors, cause the communication device to perform operations comprising:

transmitting, to one or more other communication devices that support communication with a base station of a cellular communication system using a cellular communication method and communication with a predetermined device using one or more other communication methods that are different from the cellular communication method, a request signal requesting information indicating a wireless quality for the communication using the one or more other communication methods between the predetermined device and the one or more other communication devices, in each of one or more other communication methods in the one or more other communication devices, the predetermined device being different from the communication device and the base station of the cellular communication system;

receiving, from at least any of the one or more other communication devices, a response including the information indicating the wireless quality for the communication using the one or more other communication methods between the predetermined device and the one or more other communication devices;

selecting, based on the response received by the receiving, a device to be requested to transfer the communication of the communication device from a transmission source device of the response, and selecting a communication method to be used for transferring among the one or more other communication methods, in the device; and performing connection establishment processing including requesting the device selected by the selecting to relay the communication of the communication device, by performing communication between the device and the predetermined device using the communication method selected by the selecting.

2. The communication device according to claim 1, wherein the transmitting designates the one or more other communication methods in the request signal, and requests the one or more other communication devices for the information indicating the wireless quality for the communication between the one or more other communication devices and the predetermined device in the communication method designated.

3. The communication device according to claim 1, wherein the transmitting designates, in the request signal, communication performance requested in the communication of the communication device, and requests transmission of the information indicating the wireless quality for the communication with the predetermined device in each of the one or more other communication methods, and the receiving receives the response from the one or more other communication devices capable of communicating with the predetermined device in a communication method that satisfies the communication performance.

4. The communication device according to claim 1, wherein the wireless quality includes received signal strength, a signal to noise ratio, a signal to interference plus noise ratio, reference signal received power, or reference signal received quality in the one or more other communication devices.

5. The communication device according to claim 1, wherein the one or more other communication methods include a wireless LAN communication method, or a Bluetooth communication method.

6. The communication device according to claim 1, wherein the receiving waits for the response for a predetermined period of time, and the selecting selects the device to be requested to transfer the communication, based on the response received during the predetermined period.

7. The communication device according to claim 1, wherein the selecting selects the transmission source device of the response received as the device to be requested to transfer the communication, without waiting for receiving the response from another device, based on receiving the response including the information indicating the wireless quality for the communication indicating that performance requested in transferring the communication of the communication device to the predetermined device is satisfiable.

8. The communication device according to claim 1, wherein the transmitting transmits the request signal in a broadcast manner.

9. The communication device according to claim 1, wherein the request signal includes information indicating requesting for relaying the communication of the communication device.

10. The communication device according to claim 1, wherein the communication device is a vehicle.

11. A relay device that relays communication wirelessly between a communication device and a predetermined device, the relay device comprising:

one or more processors; and a memory storing instructions that, when executed by the one or more processors, cause the relay device to perform operations comprising:

communicating with a base station of a cellular communication system using a cellular communication method and communicating with a predetermined device using one or more other communication methods that are different from the cellular communication method;

receiving, from the communication device, a request signal requesting information indicating a wireless quality for the communication using the one or more other communication methods with the predetermined device in each of one or more other communication methods in the relay device; and transmitting, to the communication device, a response including the information indicating the wireless quality for the communication using the one or more other communication methods between the predetermined device and the relay device.

12. The relay device according to claim 11, wherein the request signal includes information designating the one or more other communication methods, and the transmitting transmits the response including the information indicating the wireless quality for the communication with the predetermined device in a communication method designated.

13. The relay device according to claim 11, wherein the request signal includes information designating communication performance requested for the communication of the communication device, and the transmitting transmits the response including the information indicating the wireless quality for the communication with the predetermined device with regard to a communication method that satisfies the communication performance.

14. The relay device according to claim 11, wherein the wireless quality includes received signal strength, a signal to noise ratio, a signal to interference plus noise ratio, reference signal received power, or reference signal received quality, in the relay device.

15. The relay device according to claim 11, wherein the one or more other communication methods include a wireless LAN communication method, or a Bluetooth communication method.

16. The relay device according to claim 11, wherein the relay device is a vehicle.

17. A control method performed by a communication device that performs communication wirelessly, the control method comprising:

transmitting, to one or more other communication devices that support communication with a base station of a cellular communication system using a cellular communication method and communication with a predetermined device using one or more other communication methods that are different from the cellular communication method, a request signal requesting information indicating a wireless quality for the communication using the one or more other communication methods between the predetermined device and the one or more other communication devices, in each of one or more other communication methods in the one or more other communication devices, the predetermined device being different from the communication device and the base station of the cellular communication system;

receiving, from at least any of the one or more other communication devices, a response including the information indicating the wireless quality for the communication using the one or more other communication methods between the predetermined device and the one or more other communication devices;

selecting, based on the response received, a device to be requested to transfer the communication of the communication device from a transmission source device of the response, and selecting a communication method to be used for transferring among the one or more other communication methods, in the device; and performing connection establishment processing including requesting the device selected to relay the communication of the communication device, by performing communication between the device and the predetermined device using the communication method selected.

18. A control method performed by a relay device that relays communication wirelessly between a communication device and a predetermined device, the control method comprising:

communicating with a base station of a cellular communication system using a cellular communication method and communicating with a predetermined device using one or more other communication methods that are different from the cellular communication method;

receiving, from the communication device, a request signal requesting information indicating a wireless quality for the communication using the one or more other communication methods with the predetermined device in each of one or more other communication methods in the relay device; and transmitting, to the communication device, a response including the information indicating the wireless quality for the communication using the one or more other communication methods between the predetermined device and the relay device.

19. A non-transitory computer-readable storage medium that stores a program for causing a computer included in a communication device that performs communication wirelessly to:

transmit, to one or more other communication devices that support communication with a base station of a cellular communication system using a cellular communication method and communication with a predetermined device using one or more other communication methods that are different from the cellular communication method, a request signal requesting information indicating a wireless quality for the communication using the one or more other communication methods between the predetermined device and the one or more other communication devices, in each of one or more other communication methods in the one or more other communication devices, the predetermined device being different from the communication device and the base station of the cellular communication system;

receive, from at least any of the one or more other communication devices, a response including the information indicating the wireless quality for the communication using the one or more other communication methods between the predetermined device and the one or more other communication devices;

select, based on the response received, a device to be requested to transfer the communication of the communication device from a transmission source device of the response, and select a communication method to be used for transferring among the one or more other communication methods, in the device; and perform connection establishment processing including requesting the device selected to relay the communication of the communication device, by performing communication between the device and the predetermined device using the communication method selected.

20. A non-transitory computer-readable storage medium that stores a program for causing a computer included in a relay device that relays communication wirelessly between a communication device and a predetermined device to:

communicate with a base station of a cellular communication system using a cellular communication method and communicate with a predetermined device using one or more other communication methods that are different from the cellular communication method;

receive, from the communication device, a request signal requesting information indicating a wireless quality for the communication using the one or more other communication methods with the predetermined device in each of one or more other communication methods in the relay device; and transmit, to the communication device, a response including the information indicating the wireless quality for the communication using the one or more other communication methods between the predetermined device and the relay device.

* * * * *